United States Patent [19]

Deyer

[11] Patent Number: 4,539,654
[45] Date of Patent: Sep. 3, 1985

[54] SWITCH ARRANGEMENT FOR ACCESSING A COMPUTER

[75] Inventor: Craig E. Deyer, Akron, Pa.

[73] Assignee: RCA Corporation, Princeton, N.J.

[21] Appl. No.: 402,546

[22] Filed: Jul. 28, 1982

[51] Int. Cl.$^3$ .............................................. G06F 3/00
[52] U.S. Cl. ................................................... 364/900
[58] Field of Search ... 364/200 MS File, 900 MS File

[56] References Cited

U.S. PATENT DOCUMENTS 4,310,720  1/1982  Check, Jr. ...................... 178/22.08
4,321,695  3/1982  Redwine et al. .................... 365/174

Primary Examiner—Thomas M. Heckler
Attorney, Agent, or Firm—E. M. Whitacre; T. H. Magee; L. L. Hallacher

[57] ABSTRACT

A switch arrangement for providing access commands to a computer includes a plurality of switches categorized into three groups. The first group is exclusive or whereby only one of the switches within the group can access the computer at a given time. The second group is prioritized whereby the switches within the group access the computer in accordance with an assigned priority. The third group is random whereby any or all of the switches can access the computer at a given time.

12 Claims, 1 Drawing Figure

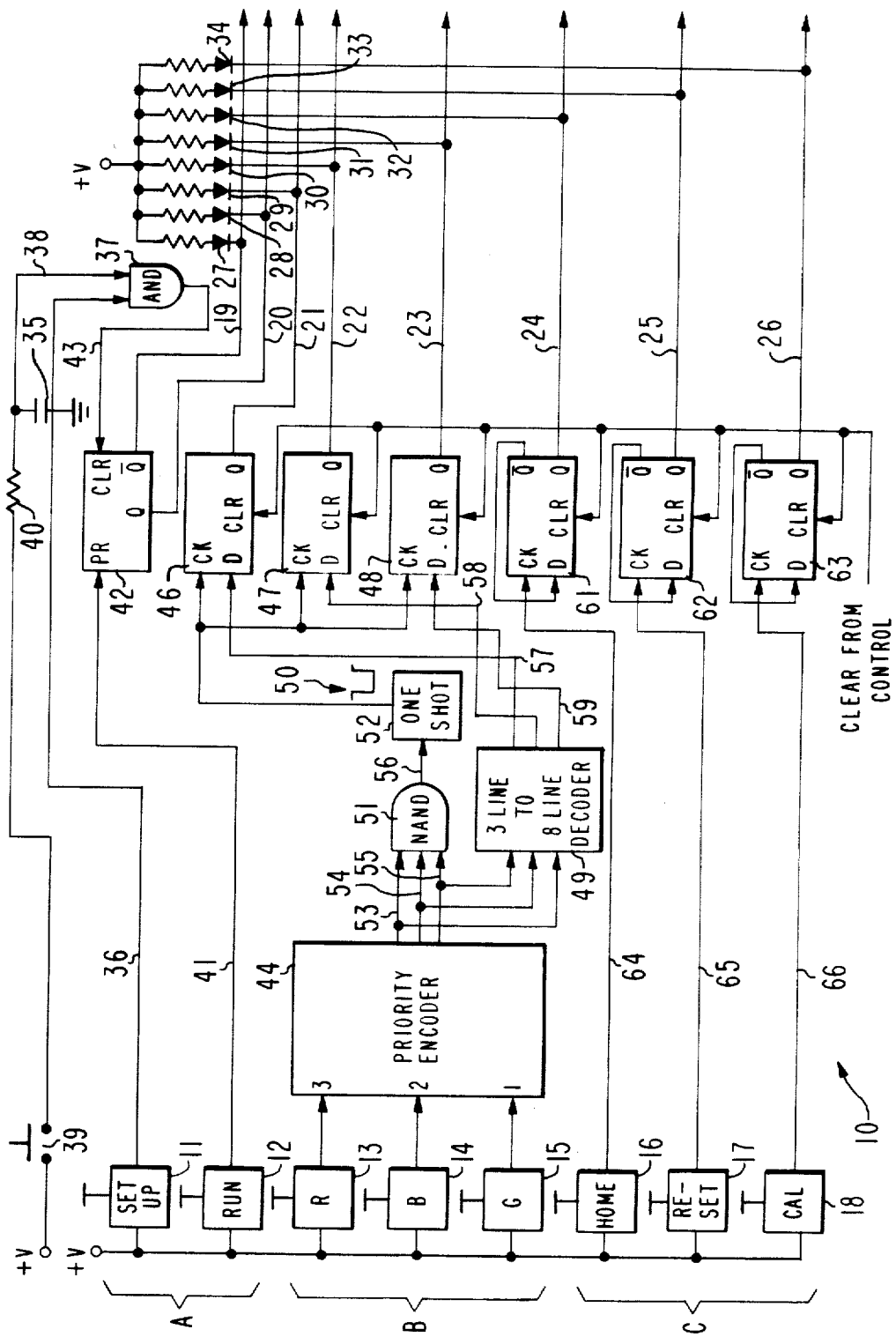

SWITCH ARRANGEMENT FOR ACCESSING A COMPUTER

BACKGROUND OF THE INVENTION

This invention relates generally to computer controlled systems and particularly to a switch arrangement for selectively accessing the computer of such a system in accordance with a desired sequence and assigned priorities.

Typically, in accessing a computer, the accessing commands are categorized into groups. The accessing commands within each group are presented differently to the computer dependent upon the manner in which the computer is intended to execute the commands. As an example, some commands can be categorized into an either-or type of group wherein the availability of one accessing command acts to the exclusion of all other commands within the group. This type of group, therefore, assures that only one command from the group is available to the computer at a given instance. Another category can be a priority type of group. Several commands of a priority group can be simultaneously presented to the computer and the computer executes the commands in an order established by priority assignments to the various commands. Another category can be a random type of group in which a plurality of commands can be simultaneously presented to the computer and the computer executes the commands at any time after all commands from higher priority groups are executed.

An example of a computerized system which uses the three categories of access command groupings set out above is a 3-in-1 lighthouse which is used to expose a photosensitive material during the application of a black matrix to the faceplate panels of color kinescopes. In this type of lighthouse, the faceplate panel and the lensing/lighting system of the lighthouse are moved relative to one another to three different positions. The black matrix material present on the inside surface of the kinescope panel is exposed to light at each of the three positions to form the matrix lines which separate the three colors of phosphor stripes which are subsequently placed on the panels. The computer utilized to control the relative movements of the panels and the lensing/lighting system, therefore, must respond to accessing commands which are categorized into the three categories set out above. The switches used to input the accessing commands are categorized identically to the commands. For example, switches which are categorized in the either-or group are the set-up and run switches. It is essential that only one of these switches access the computer at a particular time. Therefore, when either of these switches accesses the computer, the other switch is prevented from doing so. The switches which are used to provide manual commands for the relative movement of the panel and the lensing/lighting system fit into the priority type of grouping because, typically, these three switches are simultaneously closed. The switches are given priority assignments which result in movement to the three positions in the sequence which minimizes the amount of motion. Thus, the switch which results in travel from the home position to the nearest color position is given the highest priority.

Switches which fall into the random type of group are the switches used to return the lensing/lighting system to the home position, to reset the system or to calibrate the system. Any number of these switches can be actuated at a particular time and the computer executes the commands after all commands from the other groups are executed.

The instant invention is directed to a switch arrangement for accessing a computer in accordance with a variety of switch groupings.

CROSS REFERENCE TO RELATED PATENT APPLICATIONS

The following patent applications, filed of even date herewith by Craig E. Deyer, describe systems which can be used in a computer controlled system employing the instant invention.

Application Ser. No. 402,544 entitled "System For Inputting A Selected One Of A Plurality Of Inputs To A Computer".

Application Ser. No. 402,545 entitled "System For Providing A Multi-bit Input To A Computer Controlled System", now U.S. Pat. No. 4,513,394.

Application Ser. No. 402,428 entitled "System For Converting The Frequency Of A Pulse Train To A Binary Number", now U.S. Pat. No. 4,499,588.

Application Ser. No. 402,426 entitled "System For Inputting A Security Code To A Computer".

Application Ser. No. 267,750 entitled "System And Method For Controlling The Exposure Of Color Picture Tube Phosphor Screens", and Application Ser. No. 267,991 entitled "System And Method For Intermittently Moving A Picture Tube Panel On A Lighthouse", and Application Ser. No. 267,749 entitled "System And Method For Determining The Light Transmission Characteristics Of Color Picture Tube Shadow Masks", all filed on May 28, 1981 by W. R. Kelly and E. J. Alvero describe a lighthouse control system which can receive access commands from the instant invention.

SUMMARY OF THE INVENTION

A switch arrangement for providing access commands to a computer includes a plurality of individually actuated switches arranged in groups. A first group of switches selectively provides an access signal on one of a plurality of output lines in accordance with the selective actuation of the switches within the group. A second group of switches actuates a priority assignment means whereby the simultaneous actuation of more than one switch of the group sequentially connects a plurality of output lines to the switches in accordance with the priority assignment. A third group of switches provides an access signal when any of the switches within the group is actuated.

BRIEF DESCRIPTION OF THE DRAWINGS

The FIGURE is a block diagram of a preferred embodiment of the instant invention.

DETAILED DESCRIPTION OF THE PREFERRED EMBODIMENT

In the FIGURE, the switch arrangement 10 includes a plurality of Hall Effect switches 11 to 18 divided into groups A, B and C. The system is described in the environment of a 3-in-1 lighthouse used to expose the photosensitive material during the application of the black matrix to the surface of the color kinescope faceplate panels. Group A includes a set up switch 11 and a run switch 12. Group A is the either/or type of category because when the computer (not shown) is accessed through either of the switches the other switch is prohibited from accessing the computer. However, one or the other of the switches 11 or 12 accesses the computer at all times that the system is in operation. Group B includes the switches 13, 14 and 15 arranged to access the computer on a priority basis. Thus, switch 15 directs relative motion to the green position and is assigned the highest priority within Group B because of the order in which the exposures are made. The switch 14 directs relative motion to the blue position and is assigned the second highest priority within Group B. The switch 13 directs relative motion to the red position and is assigned the lowest priority within Group B because red is the last exposure made. Group C includes a home switch 16, a reset switch 17 and a calibrate switch 18 arranged in a random computer access type of group. Any or all of these switches can access the computer at a given instant, and the computer executes the commands after all commands provided by Group B are executed. The switching arrangement 10 includes outputs lines 19 to 26 to couple the access signals from the switches 11 to 18 respectively to the computer (not shown). A plurality of light emitting diodes 27 to 34 are associated with the output lines 19 to 26 respectively to visually indicate over which of the lines 19 to 26 the computer is being accessed.

The Hall Effect set up switch 11 has an output line 36 coupled to one input terminal of an AND Gate 37. The other input terminal of the AND Gate 37 receives an input from a system power on-switch 39 over a line 38 and an r-c network including a capacitor 35 and a resistor 40. The switch 39 can also be used to provide the biasing voltages to the other elements of the system.

The Hall Effect run switch 12 is coupled by a line 41 to the Preset input of a bistable logic means in the form of a D-Type flip-flop 42. The clear input of the flip-flop 42 is coupled to the output of the AND Gate 37 by a line 43. The output line of a Hall Effect switch is high when the switch is open and goes low when the switch is closed. The switch 39 stays closed when actuated and the Hall Effect switches 11 to 18 are momentarily closed when actuated. When switch 39 is closed line 38 remains low until the capacitor 35 charges and one input to the AND Gate 37 is high. This high remains until the switch 39 is opened to turn the system power off. When the switch 11 is momentarily closed, line 36 goes low and one input to the AND Gate 37 is high and the other low. The output line 43 of the AND 37 goes low to clear the flip-flop 42. The run switch 12 is open, making line 41 and the Preset input of the flip-flop 42 high. Under these conditions, the $\overline{Q}$ output of the flip-flop 42 is high, the Q output is low and the set-up LED 27 is lit and the run LED 28 is off. When the run switch 12 is momentarily closed the Preset input of the flip-flop 42 goes low, the Q output goes high, the $\overline{Q}$ output goes low and the run LED 28 is on and the set-up LED 27 is off. This condition continues until either the system power switch 39 is opened, or the set-up switch 11 is closed again. Thus, the computer is accessed over either line 19 or 20, by the set-up switch 11 or the run switch 12 but can not be simultaneously accessed by both switches.

The switches 13, 14 and 15, which form Group B, can be actuated individually or in any combination. The outputs of these switches are coupled to a priority encoder 44 such that the green switch 15 has the highest priority and the red switch 13 has the lowest priority.

The encoder 44 is a commercially available circuit, for example, a SN74LS148 available from Texas Instruments can be used. The encoder 44 receives an input from one or more of the switches 13, 14 and 15, and provides a binary number output on the lines 53, 54 and 55, depending upon which switches are closed and which closed switch has the highest priority assignment. The output lines 53, 54 and 55 of the priority encoder 44 are coupled to a three-line to eight-line decoder 49. THe decoder 49 also is commercially available, for example, a Texas Instruments SN74LS138 can be used. The lines 53, 54 and 55 are also coupled to the clock inputs of D-type flip-flops 46, 47 and 48 by way of a NAND Gate 51 and a shot multivibrator 52. The three output lines 53, 54 and 55 of the priority encoder 44 are normally high and the output line 56 of the NAND Gate 51 is normally low. In this condition the output of the one-shot 52 is high and the clock inputs of the flip-flops 46, 47 and 48 are high. When one of the output lines 53, 54 or 55 of the priority encoder 44 goes low in response to the closing of one or more of the switches 13 to 15, the output line 56 of the NAND Gate 51 goes high and fires the one-shot 52 providing an input pulse 50 to the clock inputs of the flip-flops 46, 47 and 48. The output lines 53, 54 and 55 are also coupled to the 3-line to 8-line decoder 49. The decoder 49 converts the 3 bit binary output of the priority encoder 44 back to a single output. The output lines 57, 58 and 59 of the decoder 49 are coupled to the D-input terminals of the flip-flops 46, 47 and 48, respectively. Thus, when one or more of the switches 13, 14 or 15 is momentarily closed, the priority encoder 44 provides a binary code on the input lines 53, 54 or 55 of the NAND Gate 51. The output line 56 then goes high and triggers the one-shot 52 producing the low pulse 50 to the flip-flops 46, 47 and 48. The binary code from the priority encoder 44 is simultaneously provided to the decoder 49. The decoded output is available on one of the lines 57, 58 or 59 as an input to one of the flip-flops 46, 47 or 48. When the flip-flop 52 times out, the trailing edge of the pulse 50 clocks the flip-flop and transfers the data to one of the output lines 22, 23 or 24 to access the computer. The corresponding LED 29, 30 or 31 is also lit to indicate which lines is high, i.e., which switch is actuated.

When more than one of the switches 13, 14 and 15 are simultaneously closed, one of the output lines 21, 22 and 23, accesses the computer in accordance with the priority assigned to the switches 13, 14 and 15 by the priority encoder 44. The green switch 15 is assigned the highest priority. Accordingly, when this switch and any other switch are simultaneously closed, the computer is accessed by the output line 23. The red switch 13 is assigned the lowest priority and, therefore, the output line 21 will be the last to access the computer when the red switch 13 and either of the switches 14 or 15 are simultaneously actuated. The priority encoder 44 and the 3 line-to-8 line decoder 49 are shown with three input and three output lines. Both of these types of circuits are available in the art and, typically, are capable of receiving as many as eight inputs and providing an equal number of outputs. Three inputs and three outputs are used herein because in a 3-in-1 lighthouse only three are needed. The 3 line-to-8 line converter 49 converts the 3 bit binary output of the priority encoder 44 back to a single output and accordingly, the three flip-flops 46 to 48, the three switches 13 to 15, and the three output lines 21 to 23 can be increased to eight to provide eight prioritized access commands to the computer.

The three Hall Effect switches 16, 17 and 18 of Group C are coupled by lines 64, 65 and 66 and by D-type flip-flops 61, 62 and 63 to output lines 24, 25 and 26, respectively. The flip-flops 61 to 63 have the $\overline{Q}$ output terminals tied to the D input terminals. Accordingly, the flip-flops 61, 62 and 63 are continuously actuated and can receive an input from each of the switches 16, 17 and 18 at any time. For this reason, closing any combination of the switches 15 through 18 results in a computer access on the respective output lines 24, 25 and 26. The clear input terminals of the flip-flops 46 to 48 and 61 to 63 are coupled by a line 67 to the computer, or control system with which the instant invention is associated, to provide a clear signal to the flip-flops and return the output lines 19 through 26 to their original condition after all access commands have been executed.

What is claimed is:

1. In a switch arrangement for providing access to a computer including a plurality of individually actuatable switches, an improvement comprising:
   a first group of switches, first output means responsive to the switches in said first group for continuously providing an access signal, said output means having a plurality of output lines equal in number to the number of switches in said first group and being arranged whereby said access signal is selectively available on one of said output lines, in accordance with the selective actuation of said switches;
   a second group of switches, second output means responsive to the switches in said second group, said second output means having a plurality of output lines individually connectable to particular individual switches of said second group of switches, said second output means including priority assignment means whereby the simultaneous actuation of more than one switch of said second group of switches sequentially connects said output lines to said switches in accordance with the priority assignment by said second output means;
   a third group of switches, third output means responsive to the switches in said third group and having a third plurality of output lines individually connectable to the switches of said third group whereby an access signal is available on a particular one of said third output lines when a particular one of said third switches is actuated.

2. The switch arrangement of claim 1 wherein said priority assignment means includes a priority encoder and a plurality of bistable logic means, each of said logic means providing an access signal to one of said output lines in accordance with the state of said second switches and said priority encoder.

3. The switch arrangement of claim 2 further including enabling logic means arranged between said encoder and said bistable logic means whereby said bistable logic means are enabled by said priority assignment.

4. The switch arrangement of claim 3 further including decoder means arranged between said encoder and logic means whereby said logic means are actuated by said encoder in accordance with said priority assignment.

5. The switch arrangement of claim 4 wherein said decoder means individually actuates said logic means in accordance with said priority assignment where more than one of said switches in said second group are simultaneously actuated.

6. The switch arrangement of claim 5 wherein said bistable logic means are D-type flip-flops, said enabling logic means includes at least one one-shot multivibrator, and said decoder means is a 3 line-to-8 line decoder.

7. The switch arrangement of claim 1 or 2 wherein said first output means includes a bistable logic device responsive to one of said first switches and a logic gate responsive to another of said first switches, said first output lines being responsive to said bistable logic device, said bistable logic device being responsive to said logic gate whereby said logic device changes state in response to said logic gate and said access signal is alternately available on said output lines in accordance with which of said first switches is actuated.

8. The switch arrangement of claim 7 wherein said logic gate means is an AND-Gate, and further including a start switch for providing one logic input to said AND-Gate.

9. The switch arrangement of claim 1 or 2 wherein said third output means includes a plurality of bistable logic means individually responsive to each of said third switches.

10. The switch arrangement of claim 9 wherein said bistable logic means are D-type Flip-Flops and wherein any portion of said third switches can be simultaneously actuated.

11. The switch arrangement of claim 8 wherein said third output means includes a plurality of bistable logic means individually responsive to each of said third switches.

12. The switch arrangement of claim 11 wherein said bistable logic means are D-type Flip-Flops and wherein any portion of said third switches can be simultaneously actuated.

* * * * *